US012665745B2

(12) United States Patent
Forest et al.

(10) Patent No.: US 12,665,745 B2
(45) Date of Patent: Jun. 23, 2026

(54) MACHINE LEARNING/ARTIFICIAL INTELLIGENCE (ML/AI) SYSTEM WITH PROTECTED NEURAL NETWORKS

(71) Applicant: GM Global Technology Operations LLC, Detroit, MI (US)

(72) Inventors: Thomas M. Forest, Macomb, MI (US); Di Jin, Troy, MI (US); Jacob Alan Bond, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 754 days.

(21) Appl. No.: 18/154,113

(22) Filed: Jan. 13, 2023

(65) Prior Publication Data

US 2024/0243901 A1     Jul. 18, 2024

(51) Int. Cl.

| | |
|---|---|
| *H04L 9/06* | (2006.01) |
| *B60R 16/023* | (2006.01) |
| *G05B 13/02* | (2006.01) |
| *G06F 21/60* | (2013.01) |

(52) U.S. Cl.
CPC ........ *H04L 9/0662* (2013.01); *B60R 16/0231* (2013.01); *G05B 13/027* (2013.01); *G06F 21/602* (2013.01)

(58) Field of Classification Search
CPC . H04L 9/0662; B60R 16/0231; G05B 13/027; G06F 21/602
See application file for complete search history.

(56) References Cited

FOREIGN PATENT DOCUMENTS

EP          3767548 A1 *   1/2021   ............. G06N 3/063

OTHER PUBLICATIONS

Manaar Alam et al.; Deep-Lock: Secure Authorization for Deep Neural Networks; arXiv:2008.05966v1 [cs.LG] Aug. 13, 2020 (Year: 2020).*
Jinyu Tian et al.; Probabilistic Selective Encryption of Convolutional Neural Networks for Hierarchical Services; arXiv:2105.12344v1 [cs.CR] May 26, 2021 (Year: 2021).*

* cited by examiner

*Primary Examiner* — David Yi
*Assistant Examiner* — Paul Coleman
(74) *Attorney, Agent, or Firm* — Vivacqua Crane, PLLC

(57)          ABSTRACT

A machine learning/artificial intelligence (ML/AI) system includes one or more controllers storing one or more neural networks in memory. The one or more neural networks include a plurality of layers including an input layer, one or more hidden layers, and an output layer, and one or more nodes provided for each of the plurality of layers of the one or more neural networks. Each of the plurality of layers are connected to a subsequent layer of the one or more neural networks by a connection. The connection connects a first node of an earlier layer with a second node of a later layer. The one or more neural networks also include plurality of weights, where each weight is associated with a connection and only a portion of the plurality of weights of the one or more neural networks are encrypted or protected.

17 Claims, 2 Drawing Sheets

MACHINE LEARNING/ARTIFICIAL INTELLIGENCE (ML/AI) SYSTEM WITH PROTECTED NEURAL NETWORKS

INTRODUCTION

The present disclosure relates to a machine learning/artificial intelligence (ML/AI) system including one or more partially encrypted neural networks that are protected from reverse engineering. The present disclosure also relates to a ML/AI system including one or more neural networks that are protected from reverse engineering based on one or more coded approaches.

Neural networks are widely used for a variety of applications such as, but not limited to, pattern recognition, anomaly detection, decision making, and object detection. For example, an array of neural networks may be used to power vehicle perception in an autonomous vehicle. A neural network is trained in order to determine the values for the weights and biases that best maps input sources to a final output of the neural network. Training a neural network involves first labeling a large amount of training data, which is often computationally intensive. Once the training data is labeled, the weights and biases are determined based on an iterative process, which is also computationally intensive. Since training a neural network is a resource intensive task, an adversary may attempt to gain access to the neural network to determine the values for the weights and biases. Thus, the neural network may be completely encrypted to prevent adversaries from gaining access to the weights and biases.

Neural networks tend to be relatively large in size to begin with, even without encryption. For example, some completely encrypted neural networks may be at least one hundred megabytes in size. It is to be appreciated that decryption may be a computationally intensive operation that may require specialized hardware to accelerate the decryption. If the entirety of the neural network is encrypted, then it may take a longer time to decrypt, thereby impacting startup performance. Furthermore, a system may be composed of multiple completely encrypted neural networks, which may further exacerbate the startup performance. Also, due to the relatively large size of the neural network, in some instances the time required to decrypt the neural network may exceed system startup time requirements.

Thus, while completely encrypted neural networks achieve their intended purpose, there is a need in the art for protecting a neural network from reverse engineering that results in reduced decryption time.

SUMMARY

According to several aspects, a machine learning/artificial intelligence (ML/AI) system for a vehicle is disclosed. The ML/AI system includes one or more controllers storing one or more neural networks in memory. The one or more neural networks include a plurality of layers including an input layer, one or more hidden layers, and an output layer. The one or more neural networks also include one or more nodes provided for each of the plurality of layers of the one or more neural networks, where each of the plurality of layers are connected to a subsequent layer of the one or more neural networks by a connection, and where the connection connects a first node of an earlier layer with a second node of a later layer. A bias is introduced to each of the one or more nodes that are part the one or more hidden layers and the output layer. The one or more neural networks also include a plurality of weights, where each weight is associated with a connection and only a portion of the plurality of weights of the one or more neural networks are encrypted.

In another aspect, at least a portion of the plurality of weights connecting at least a portion of a last half of the plurality of layers of the one or more neural networks are encrypted.

In yet another aspect, a plurality of biases located in at least a portion of a last half of the plurality of layers are encrypted.

In an aspect, at least one of the plurality of weights connecting one or more consecutive layers are encrypted, and the plurality of weights connecting at least one layer succeeding the one or more consecutive layers remain unencrypted.

In another aspect, at least one of a plurality of biases in one or more consecutive layers are encrypted, and the plurality of biases in at least one layer succeeding the one or more consecutive layers of the one or more neural networks remain unencrypted.

In yet another aspect, the plurality of weights and a plurality of biases identified as being more consequential are encrypted. A layer of the one or more neural networks is identified as being more consequential based on a level of change that values of the plurality of weights and the plurality of biases undergo during training.

In an aspect, a binary representation represents a numerical value of the plurality of weights and a plurality of biases.

In another aspect, a subset of bits that are part of the binary representation of the plurality of weights of at least one layer of neural network and the plurality of biases are encrypted.

In yet another aspect, the one or more controllers execute a predefined algorithm that that selects specific bits of the binary representation of the plurality of weights and a plurality of biases of at least one layer of the one or more neural networks to encrypt.

In an aspect, the one or more controllers apply a keyed permutation to at least one of the following: at least a portion of the plurality of weights and at least a portion of plurality of biases to determine a set of permutated weights and biases.

In another aspect, an exclusive OR function is applied to a portion of the plurality of weights and a plurality of biases of the one or more neural networks.

In yet another aspect, the one or more controllers execute instructions to apply an exclusive OR to an unencrypted value of a weight that is part of an encrypted layer with an unencrypted value of a weight that is part of an unencrypted layer, and store a result of the exclusive OR function in a position of a value of the unencrypted weight of the unencrypted layer. In one or more controllers also apply an exclusive OR to an unencrypted value of a bias that is part of an encrypted layer with an unencrypted value of a bias that is part of an unencrypted layer and store a result of the exclusive OR function in a position of the value of the unencrypted bias of the unencrypted layer.

In an aspect, the one or more controllers execute a stream cipher that generates a cryptographically secure sequence of pseudorandom values that include a predefined number of pseudorandom values. The predefined number of pseudorandom values is selected to match a number of weights and biases that are part of a first preselected group of weights and biases.

In another aspect, the one or more controllers execute instructions to apply an exclusive OR function to each pseudorandom value of the cryptographically secure sequence of pseudorandom values and a binary representation of a value of either an unencrypted weight or an unencrypted bias of the first preselected group of unencrypted weights and biases.

In another aspect, a ML/AI system includes one or more controllers storing two or more neural networks in memory. The two or more neural networks each include a plurality of layers including an input layer, one or more hidden layers, and an output layer. The two or more neural networks each one or more nodes provided for each of the plurality of layers of the one or more neural networks, where each of the plurality of layers are connected to a subsequent layer of the one or more neural networks by a connection, and where the connection connects a first node of an earlier layer with a second node of a later layer. A plurality of biases are introduced to each of the one or more nodes that are part the one or more hidden layers and the output layer. Each of the two or more neural networks include plurality of weights, where each weight is associated with a connection. A first neural network is at least partially encrypted and a second neural network is represented based on a difference between unencrypted values of the plurality of weights and the plurality of biases of the first neural network and unencrypted values of the plurality of weights and the plurality of biases of the second neural network.

In another aspect, the difference between the unencrypted values of the plurality of weights and the plurality of biases of the first neural network and the unencrypted values of the plurality of weights and the plurality of biases of the second neural network represents one or more of the following: a numerical difference in value and an exclusive OR function.

In yet another aspect, the ML/AI system includes one or more controllers storing one or more neural networks in memory. The one or more neural networks include a plurality of layers including an input layer, one or more hidden layers, and an output layer. The one or more neural networks include one or more nodes provided for each of the plurality of layers of the one or more neural networks, where each of the plurality of layers are connected to a subsequent layer of the one or more neural networks by a connection, and where the connection connects a first node of an earlier layer with a second node of a later layer, and where a bias is introduced to each of the one or more nodes that are part the one or more hidden layers and the output layer. The one or more neural networks also include a plurality of weights, where each weight is associated with a connection, and wherein at least a portion of the plurality of weights and a plurality of biases of the one or more neural networks are protected from reverse engineering based on one or more coded approaches.

In another aspect, the one or more coded approaches include applying a keyed permutation to at least one of the following: a portion of the plurality of weights and a portion of the plurality of biases.

In yet another aspect, the one or more controllers execute instructions to apply an exclusive OR to an unencrypted value of a weight that is part of an encrypted layer with an unencrypted value of a weight that is part of an unencrypted layer and store a result of the exclusive OR function in a position of a value of the unencrypted weight of the unencrypted layer. The one or more controllers execute instructions to apply an exclusive OR to an unencrypted value of a bias that is part of an encrypted layer with an unencrypted value of a bias that is part of an unencrypted layer and store a result of the exclusive OR function in a position of the value of the unencrypted bias of the unencrypted layer.

In an aspect, the one or more coded approaches include generating a cryptographically secure sequence of pseudorandom values of a fixed size by a stream cipher that include a predefined number of pseudorandom values, where the predefined number of pseudorandom values is selected to match a number of weights and biases that are part of a first preselected group of weights and biases. Each of the weights and the biases of the first preselected group of weights are biases are exclusive ORed with one of the pseudorandom values.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
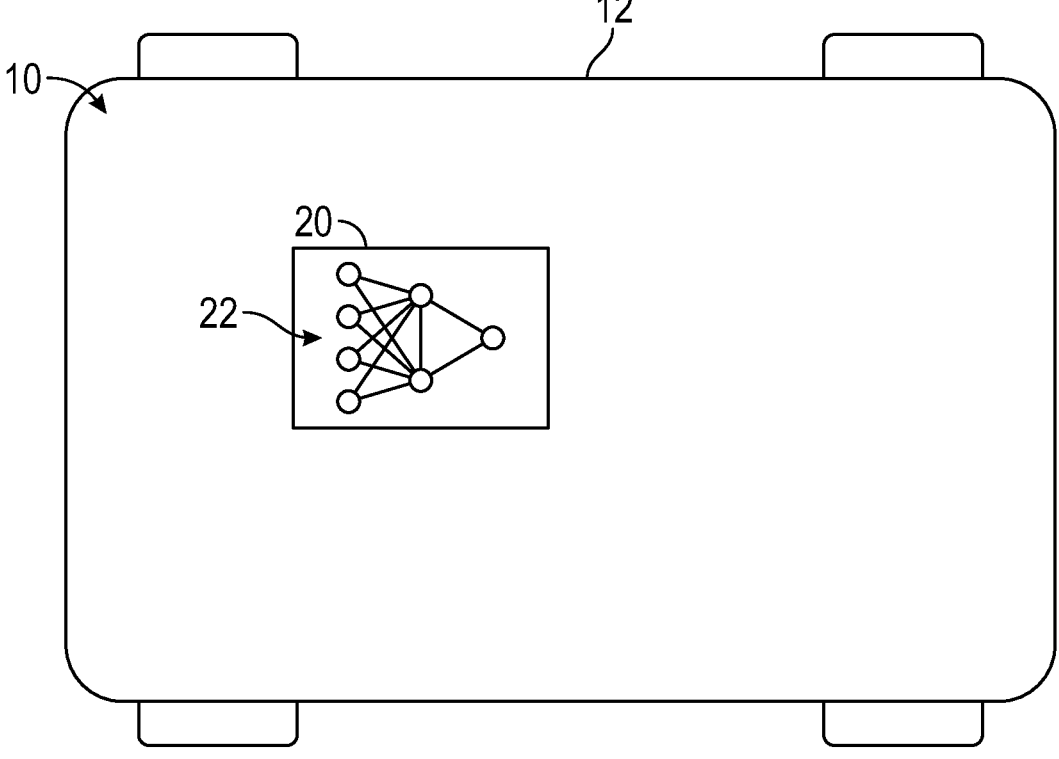
FIG. 1 is a schematic diagram of vehicle including a machine learning/artificial intelligence (ML/AI) system, where the ML/AI system includes one or more controllers that store one or more neural networks, according to an exemplary embodiment.

Referring to FIG. 1, an exemplary machine learning/artificial intelligence (ML/AI) system 10 for a vehicle 12 is illustrated. It is to be appreciated that the vehicle 12 may be any type of vehicle such as, but not limited to, a sedan, truck, sport utility vehicle, van, or motor home. The ML/AI system 10 includes one or more controllers 20, where one or more neural networks 22 are stored in a respective memory of the one or more controllers 20. It is to be appreciated that the ML/AI system 10 may be any type of system within the vehicle 12 that executes machine learning or artificial intelligence algorithms such as, for example, an autonomous or semi-autonomous driving system. It is also to be appreciated that while FIG. 1 illustrates the ML/AI system 10 implemented on a vehicle, FIG. 1 is merely exemplary in nature and the disclosed ML/AI system 10 is not limited to a vehicle. Indeed, the ML/AI system 10 may be employed in any type of resource constrained cyber-physical or embedded system.

Figure 2:
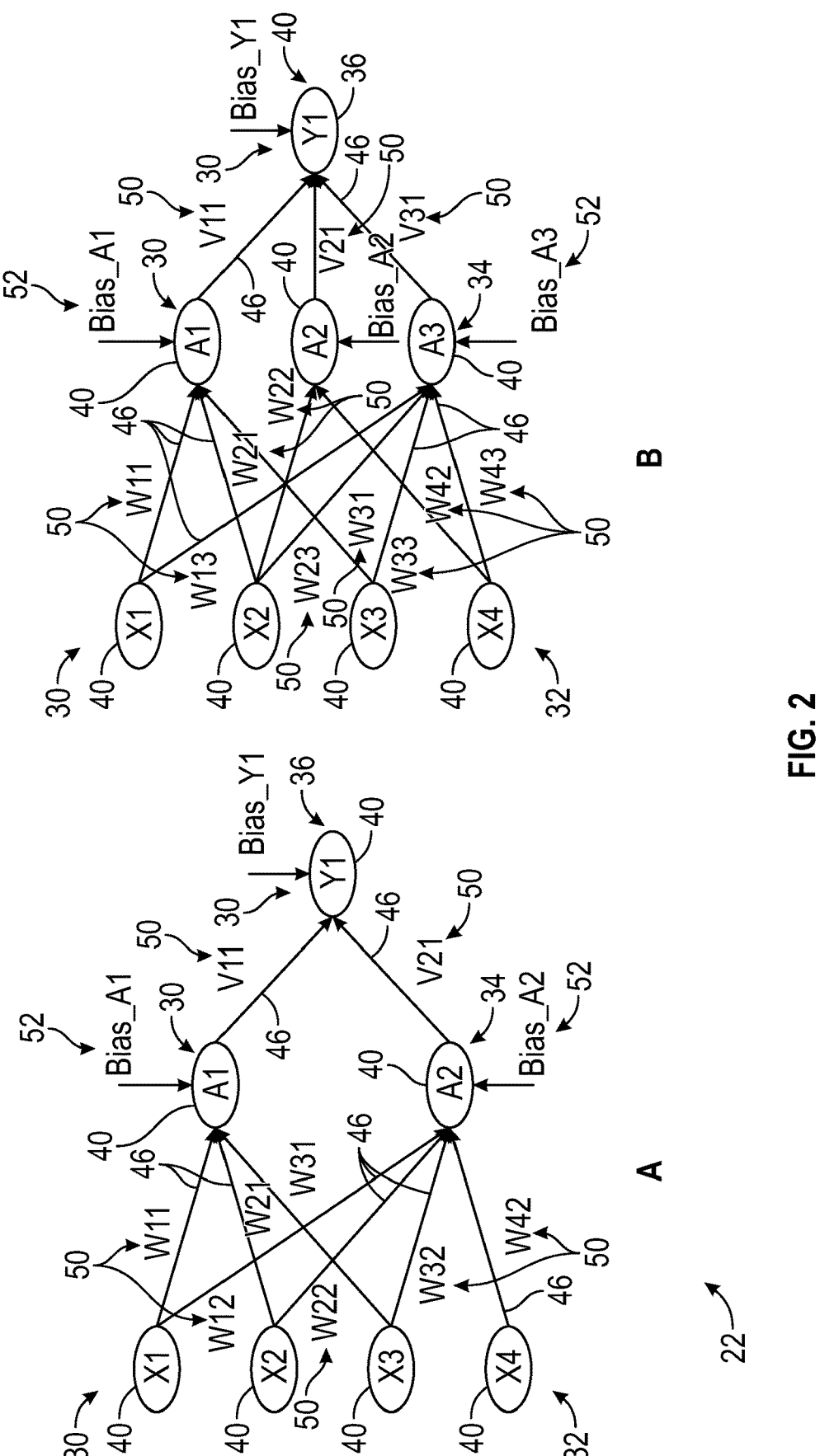
FIG. 2 is a schematic diagram of the one or more neural networks, according to an exemplary embodiment.

FIG. 2 illustrates a portion of two exemplary neural networks 22, which are labeled as A and B. It is to be appreciated that while FIG. 2 illustrates only two neural networks 22, any number of neural networks 22 may be stored in the memory of the one or more controllers 20. The one or more neural networks 22 each include a plurality of layers 30 that include an input layer 32, one or more hidden layers 34, and an output layer 36. It is to be appreciated that while FIG. 2 illustrates only a single hidden layer 34, this is only for purposes of simplicity and clarity, and the neural network 22 may include a plurality of hidden layers 34.

One or more nodes 40 are provided for each of the plurality of layers 30. In the example as shown in FIG. 2, the input layer 32 for both neural networks A and B includes input nodes X1, X2, X3, X4. The hidden layer 34 for neural network A includes nodes A1 and A2, while the hidden layer 34 for neural network B includes nodes A1, A2, A3. The output layer 36 for neural networks A and B also include a single node Y1. Each layer 30 is connected to a subsequent layer 30 of the one or more neural networks 22 by a connection 46. Specifically, each connection 46 of the one or more neural networks 22 connects a first node 40 of an earlier layer 30 with a second node 40 of a later layer 30. A weight 50 is associated with each connection 46, where the weight 50 is expressed as a constant and represents the strength of the connection 46 between two nodes 40. For example, if a weight W11 that connects the node X1 in the input layer 32 to node A1 in the hidden layer 34 increases in value, this in turn increases the influence node X1 has over node A1.

A bias 52 is introduced to each of the nodes 40 that are part of the one or more hidden layers 34 and the output layer 36 of the one or more neural networks 22. In the example as shown in FIG. 2, a bias A1 is input into the node A1 for both neural networks A and B, a bias A2 is input into the node A2 for both neural networks A and B, a bias A3 is input into the node A3 for neural network B, and a bias Y1 is input into the node Y1 for both neural networks A and B.

In one embodiment, a portion of the weights 50 of the one or more neural networks 22 are encrypted. Specifically, in one embodiment, at least a portion of the weights 50 connecting at least a portion of the last half of the plurality of layers 30 of the one or more neural networks 22 are encrypted. Specifically, in an embodiment at least a portion of the weights 50 connecting the last third of the plurality of layers 30 of the one or more neural networks 22 are encrypted, and in another embodiment the portion of the weights 50 connecting the last quarter of the plurality of layers 30 of the one or more neural networks 22 are encrypted. Additionally, in at least some embodiments, a plurality of biases 52 located within at least a portion of the last half of the plurality of layers 30 are encrypted as well. For example, the weights V11 and V21 and the bias Y1 may be encrypted for neural network A, while the weights W11, W12, W21, W22, W31, W32, and W42 and the biases A1, A2 remain unencrypted. Similarly, only the weights V11, V21, and V31 and the bias Y11 may be encrypted for neural network B. In another example, if the neural network 22 includes ten layers 30, then the weights 50 that are part of the last five layers 30 of the neural network 22 may be encrypted. As explained below, the plurality of weights 50 and the plurality of biases 52 may be protected from reverse engineering based on one or more coded approaches as well.

It is to be appreciated that the one or more neural networks 22 are trained based on a base neural network model that is already pre-trained, where the base neural network is utilized as a baseline. It is also to be appreciated that the values of the weights 50 connecting the later layers 30 of the one or more neural networks 22 tend to be more consequential when compared to the first half of the front layers 30 of the one or more neural networks 22. This is because the earlier layers 30 of the one or more neural networks 22 are primarily directed towards feature extraction, while the later layers 30 are directed towards classification and regression. Accordingly, training will significantly change the values of the weights 50 and biases 52 connecting the later layers 30 and will have less of an impact on the weights 50 and biases 52 connecting the front layers 30 of the one or more neural networks 22.

In another embodiment, instead of encrypting the weights 50 connecting at least a portion of the last half of the plurality of layers 30, the weights 50 are encrypted based on an alternating pattern created between the plurality of layers 30. Specifically, the alternating pattern includes encrypting at least one of the weights 50 connecting one or more consecutive layers 30, where the weights 50 connecting at least one layer 30 succeeding the one or more consecutive layers 30 of the one or more neural networks 22 remain unencrypted. For example, in one embodiment, the weights 50 connecting every other layer 30 of the one or more neural networks 22 may be encrypted. In another example, the weights 50 connecting two consecutive layers 30 of the one or more neural networks 22 are unencrypted and the weights 50 connecting the layer 30 succeeding the two consecutive layers 30 may be encrypted (i.e., two layers 30 remain unencrypted and the weights 50 connecting the succeeding layer 30 are encrypted). In still another example, the weights 50 connecting two consecutive layers 30 of the one or more neural networks 22 are encrypted, and the next two succeeding layers 30 of the neural network 22 remain unencrypted. Additionally, one or more biases 52 may also be encrypted based on the alternating pattern as well, where at least one of the one or more biases 52 located in one or more consecutive layers 30 are encrypted, and the biases 52 connecting at least one layer 30 succeeding the one or more consecutive layers 30 of the one or more neural networks 22 remain unencrypted.

In still another embodiment, the plurality of layers 30 of the one or more neural networks 22 are evaluated, and the plurality of weights 50 and the one or more biases 52 of one or more layers 30 that are identified as being more consequential are encrypted. As explained above, a layer 30 of the one or more neural networks 22 is identified as being more consequential based on a level of change that the values of the weights 50 and biases 52 undergo with respect to their starting points during training, where the later layers 30 of the one or more neural networks 22 undergo a more significant change in value when compared to the earlier layers 30. For example, in one embodiment, the last three layers 30 or, in the alternative, the last five layers 30 of a residual neural network ResNet-18, which includes eighteen layers, are identified as being more consequential based on the level of change that the values of the weights 50 and biases 52 undergo during training, and therefore are encrypted. In another example, the last six layers 30 of a ResNet-34, which include thirty-four layers, are identified as being more consequential based on the level of change that the values of the weights 50 and biases 52 undergo during training.

In an embodiment, a binary representation is utilized to represent a numerical value of each weight 50 and each bias 52. The binary representation may include any number of bits, and in one embodiment is expressed as a 16-bit representation, a 32-bit representation, a 64-bit representation, a 128-bit representation, or a 256-bit representation. A subset of bits that are part of the binary representation of the weights 50 of at least one layer 30 of the one or more neural networks 22 are encrypted. That is, some portion of bits that are less than the entirety of the binary representation of the weights 50 are encrypted. For example, in one embodiment, either the least significant bit or the most significant bit of the binary representation of the weights 50 of at least one layer 30 of the one or more neural networks 22 is encrypted. In another approach, one half of the bits that represent either the least significant bits or the most significant bits of the binary representation of the weights 50 are encrypted. Alternatively, in another embodiment, the one or more controllers 20 execute a predefined algorithm that that selects specific bits of the binary representation of the weights 50 of at least one layer 30 to encrypt. In addition to, or in the alternative, the binary representation of the one or more biases 52 of at least one layer 30 may be encrypted as well. Specifically, the predefined algorithm may anticipate the number and the position of the bits that are constant for all the weights 50 and biases 52 for a given type of computer number format, where the number and position of the bits are a design parameter. For example, the predefined algorithm may encrypt the sixteen most significant mantissa bits of a 32-bit floating point number.

In yet another embodiment, instead of or in addition to encrypting a portion of the plurality of weights 50 and biases 52 of the neural network 22, at least a portion of the weights 50 and biases 52 are protected from reverse engineering based on a coded approach. The coded approach protects the values of the weights 50 and biases 52 from reverse engineering. In some implementations, the coded approach may include encrypting the values of the weights 50 and biases 52, however, it is to be appreciated that encryption is not always employed. In one embodiment, the coded approach includes the one or more controllers 20 (FIG. 1) applying a keyed permutation to at least a portion of the plurality of weights 50 and the one or more biases 52 to determine a set of permutated weights and biases. Specifically, the one or more controllers 20 apply the keyed permutation to either all of the plurality of weights 50 and all of the plurality of biases 52 that are part of a neural network 22, or a subset of the plurality of weights 50 and a subset of the plurality of biases 52 of a neural network 22 to determine a set of permutated weights and biases. It is to be appreciated that the original value of the permutated weights and biases are not modified. That is, the permutated weights and biases are not encrypted. However, the order of the values corresponding to the plurality of weights 50 and the one or more biases 52 are rearranged as set forth by a cryptographic key, and as a consequence, the identity of the nodes 40 affected by a particular weight 50 or bias 52 is modified, thereby changing the behavior of the neural network 22. The set of permutated weights and biases are unable to be reverted back to the original arrangement of values without the cryptographic key. Accordingly, although the permutated weights and biases are not encrypted, an adversary is unable to reverse engineer the correct arrangement of the permutated weights and biases without access to the cryptographic key.

In another embodiment, the plurality of weights 50 and one or more biases 52 of a portion of the plurality of layers 30 of the one or more neural networks 22 are encrypted, and the remaining portion of the layers 30 of the one or more neural networks 22 remain unencrypted. Instead of encryption, an exclusive OR function is applied to remaining portion of the layers 30 that are unencrypted. Specifically, the one or more controllers 20 (FIG. 1) apply an exclusive OR function to an unencrypted value of a weight 50 that is part of an encrypted layer 30 of the neural network 22 and an unencrypted value of a weight 50 that is part of an unencrypted layer 30, where the result of the exclusive OR function is stored in a position of the value of the unencrypted weight 50 that is part of the unencrypted layer 30. For example, in one illustrative embodiment, the unencrypted value of the weight 50 that is part of the encrypted layer 30 includes value A before encryption, and value A' after encryption. The unencrypted value of the weight 50 that is part of the unencrypted layer 30 includes value B. The unencrypted value A of the unencrypted weight 50 that is part of the encrypted layer 30 is exclusive ORed with the unencrypted value B of the unencrypted weight 50 that is part of the unencrypted layer 30, and the result of the exclusive OR function B' is stored in the location of the unencrypted value of the weight 50 that is part of the unencrypted layer 30.

In another approach for applying the exclusive OR function, at least one layer 30 of the neural network 22 is first encrypted. An exclusive OR function is applied to one of unencrypted values of the weights 50 of the encrypted layer 30 and a corresponding one of the unencrypted values of the weights 50 of a first unencrypted layer 30 of the neural network 22, where the result of the exclusive OR function is stored in a position of the corresponding unencrypted value of the weight 50 of the first unencrypted layer 30. The exclusive OR function is repeated for each of the unencrypted values of the weights 50 that are part of the first unencrypted layer 30 of the neural network 22. In an embodiment, the exclusive OR function is also repeated for unencrypted values of biases 52 of the first unencrypted layer 30 of the neural network 22. Then, the exclusive OR function is applied to one of the unencrypted values of the weights 50 of the encrypted layer 30 and an unencrypted value of the weight 50 of a second unencrypted layer 30 of the neural network 22, and the result of the exclusive OR function is stored in a position of the value of the unencrypted weight 50 of the second unencrypted layer 30. For example, the unencrypted value A of the unencrypted weight 50 that is part of the encrypted layer 30 is exclusive ORed with the unencrypted value B of the unencrypted weight 50 that is part of the first unencrypted layer 30, and the result of the exclusive OR function B' is stored in the location of the unencrypted value of the weight 50 that is part of the first unencrypted layer 30. Then, the unencrypted value A of the unencrypted weight 50 of the encrypted layer 30 is exclusive ORed with an unencrypted value C of the second unencrypted layer 30, and the result of the exclusive OR function C' is stored in the location of the unencrypted value of the weight 50 that is part of the second unencrypted layer 30. The exclusive OR function is repeated for each of the unencrypted values of the weights 50 that are part of the second unencrypted layer 30 of the neural network 22. In an embodiment, the exclusive OR function is also repeated for unencrypted values of the biases 52 of the second unencrypted layer 30 of the neural network 22. The one or more controllers 20 (FIG. 1) may continue to apply the exclusive OR function to an entire portion of the neural network 22 that is unencrypted or, in the alternative, the exclusive OR function is applied to only a portion of the neural network 22 that is unencrypted.

In still another approach for protecting the one or more neural networks 22 based on a coded approach, the one or more controllers 20 (FIG. 1) execute a stream cipher that generates a cryptographically secure sequence of pseudorandom values, where the sequence of pseudorandom values include a predefined number of pseudorandom values. The predefined number of pseudorandom values is selected to match a number of weights 50 and biases 52 that are part of a preselected group of weights 50 and biases 52. That is, in other words, each pseudorandom value corresponds to one of the weights 50 and biases 52 that are part of the preselected group of weights 50 and biases 52. For example, if the preselected group of weights 50 and biases 52 include 250 unique weights 50 and biases 52, then the predefined number of pseudorandom values is also 250. As explained below, each pseudorandom value of the sequence of pseudorandom values are exclusive ORed with a binary representation of one of the weights 50 and biases 52 that are part of the preselected group of weights 50 and biases 52. In an embodiment, each pseudorandom value of the sequence of pseudorandom values include a fixed size. The fixed size of each pseudorandom value is selected to match a size of the binary representation of one of the weights 50 or biases 52.

For example, if the binary representation of the weights 50 and the biases 52 are expressed as a 32-bit floating point number, then each pseudorandom value is also a 32-bit floating point number. Each pseudorandom value of the sequence of pseudorandom values is exclusive ORed with the binary representation of either one of the unencrypted weights 50 or one of the unencrypted biases 52 of a first preselected group of unencrypted weights 50 and biases 50, where the number of unencrypted weights 50 and biases 52 that are part of the first preselected group of unencrypted weights 50 and biases 52 is equal to the predefined number of pseudorandom values of the sequence of pseudorandom values. Once each pseudorandom value of the sequence of pseudorandom values has been used, then the sequence of pseudorandom values is re-used, where each pseudorandom value of the sequence of pseudorandom values is exclusive ORed with the binary representation of one of the unencrypted weights 50 of a second preselected group of unencrypted weights 50 and biases 52. This process may continue until the exclusive OR function is applied to all of the weights 50 and biases 52 that are part of the neural network 22 or, in the alternative, a predetermined portion of the weights 50 and biases 52 that are part of the neural network 22. For example, in one embodiment, the exclusive OR function may be applied to only the weights 50 and the biases 52 that are part of the later layers 30 of the neural network 22.

It is to be appreciated that each of the techniques as described above may be combined together to protect the one or more neural networks 22. Furthermore, in one embodiment, instead of encrypting a portion of the plurality of weights 50 and the biases 52 of the neural network 22, at least a portion of the weights 50 and biases 52 are protected from reverse engineering based on one or more of the coded approaches as described above. Specifically, the coded approaches include applying a keyed permutation to at least a portion of the plurality of weights 50 and the one or more biases 52, applying an exclusive OR function to at least a portion of the plurality of weights 50 and the one or more biases 52, and generating a sequence of pseudorandom values by a stream cipher, where each pseudorandom value is of the same size as the binary representation of one of the weights 50 or biases 52.

In still another embodiment, two or more neural networks 22 are stored in a respective memory of the one or more controllers 20 (FIG. 1). In one embodiment, a first neural network A is at least partially encrypted. Specifically, the first neural network A is either fully encrypted based on any known technique or, in the alternative, is partially encrypted based on any of the techniques described in the present disclosure. A second neural network B is represented based on a difference between unencrypted values of the plurality of weights 50 and biases 52 of the first neural network A and unencrypted values of the weights 50 and biases 52 of the second neural network B, where the difference is stored in a position of the values of the unencrypted weights 50 and biases 52 of the second neural network B. The difference between the values of the unencrypted plurality of weights 50 and biases 52 of the first neural network A and the values of the unencrypted plurality of weights 50 and biases 52 of the second neural network B represents a numerical difference in value or an exclusive OR function, where the numerical difference is the result of subtracting two numbers. The second neural network B is recovered by first decrypting the first neural network A. Once the first neural network A is decrypted, then the difference stored in the values of the unencrypted plurality of weights 50 and the biases 52 of the second neural network B is applied to the decrypted values of the weights 50 and the biases 52 of the first neural network A to recover the values of the unencrypted weights 50 and biases 52 of the second neural network B. Although FIG. 1 illustrates only two neural networks 22, it is to be appreciated that FIG. 1 is merely exemplary in nature and only two neural networks 22 are shown for purposes of simplicity and clarity. Indeed, it is to be appreciated that multiple neural networks 22 may be protected based on the encrypted neural network A.

Referring generally to the figures, the disclosed neural network provides various technical effects and benefits. Specifically, the disclosed neural network provides an approach for protecting the values of the weights and biases from adversaries, where decrypting the disclosed neural network requires less time and computational resources when compared to conventional encryption techniques encrypting the entire neural network. Specifically, for example, a partially encrypted neural network requires less time and computational resources to decrypt when compared to a completely encrypted neural network. Thus, the values of the weights and biases are protected and may be determined without the need for a hardware cryptographic accelerator, or when specialized hardware to accelerate decryption is unavailable.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A machine learning/artificial intelligence (ML/AI) system for a vehicle, the ML/AI system comprising:

one or more controllers storing one or more neural networks in memory, the one or more neural networks including:

a plurality of layers including an input layer, one or more hidden layers, and an output layer;

one or more nodes provided for each of the plurality of layers of the one or more neural networks, wherein each of the plurality of layers are connected to a subsequent layer of the one or more neural networks by a connection, and wherein the connection connects a first node of an earlier layer with a second node of a later layer, and wherein a bias is introduced to each of the one or more nodes that are part the one or more hidden layers and the output layer; and a plurality of weights, wherein each weight is associated with a connection and only a portion of the plurality of weights of the one or more neural networks are encrypted, wherein a binary represen-
tation represents a numerical value of the plurality of
weights and a plurality of biases, and wherein the
one or more controllers execute:
    a predefined algorithm that that selects specific bits of
    the binary representation of the plurality of weights
    and a plurality of biases of at least one layer of the
    one or more neural networks to encrypt, wherein the
    predefined algorithm anticipates the number and the
    position of the specific bits that are constant for all
    the weights and biases for a given type of computer
    number format.

2. The ML/AI system of claim 1, wherein at least a portion
of the plurality of weights connecting at least a portion of a
last half of the plurality of layers of the one or more neural
networks are encrypted.

3. The ML/AI system of claim 1, wherein a plurality of
biases located in at least a portion of a last half of the
plurality of layers are encrypted.

4. The ML/AI system of claim 1, wherein at least one of
the plurality of weights connecting one or more consecutive
layers are encrypted, and the plurality of weights connecting
at least one layer succeeding the one or more consecutive
layers remain unencrypted.

5. The ML/AI system of claim 1, wherein at least one of
a plurality of biases in one or more consecutive layers are
encrypted, and the plurality of biases in at least one layer
succeeding the one or more consecutive layers of the one or
more neural networks remain unencrypted.

6. The ML/AI system of claim 1, wherein the plurality of
weights and a plurality of biases identified as being more
consequential are encrypted, and wherein a layer of the one
or more neural networks is identified as being more conse-
quential based on a level of change that values of the
plurality of weights and the plurality of biases undergo
during training.

7. The ML/AI system of claim 1, wherein a subset of bits
that are part of the binary representation of the plurality of
weights of at least one layer of neural network and the
plurality of biases are encrypted.

8. The ML/AI system of claim 1, wherein the one or more
controllers apply a keyed permutation to at least one of the
following: at least a portion of the plurality of weights and
at least a portion of plurality of biases to determine a set of
permutated weights and biases.

9. The ML/AI system of claim 1, wherein an exclusive
OR function is applied to a portion of the plurality of
weights and a plurality of biases of the one or more neural
networks.

10. The ML/AI system of claim 9, wherein the one or
more controllers execute instructions to:
    apply an exclusive OR to an unencrypted value of a
    weight that is part of an encrypted layer with an
    unencrypted value of a weight that is part of an unen-
    crypted layer;
    store a result of the exclusive OR function in a position of
    a value of the unencrypted weight of the unencrypted
    layer;
    apply an exclusive OR to an unencrypted value of a bias
    that is part of an encrypted layer with an unencrypted
    value of a bias that is part of an unencrypted layer; and
    store a result of the exclusive OR function in a position of
    the value of the unencrypted bias of the unencrypted
    layer.

11. The ML/AI system of claim 1, wherein the one or
more controllers execute a stream cipher that generates a
cryptographically secure sequence of pseudorandom values that include a predefined number of pseudorandom values,
wherein the predefined number of pseudorandom values is
selected to match a number of weights and biases that are
part of a first preselected group of weights and biases.

12. The ML/AI system of claim 11, wherein the one or
more controllers execute instructions to:
    apply an exclusive OR function to each pseudorandom
    value of the cryptographically secure sequence of pseu-
    dorandom values and a binary representation of a value
    of either an unencrypted weight or an unencrypted bias
    of the first preselected group of unencrypted weights
    and biases.

13. A ML/AI system, the ML/AI system comprising:
one or more controllers storing one or more neural
    networks in memory, the one or more neural networks
    including:
    a plurality of layers including an input layer, one or
        more hidden layers, and an output layer;
    one or more nodes provided for each of the plurality of
        layers of the one or more neural networks, wherein
        each of the plurality of layers are connected to a
        subsequent layer of the one or more neural networks
        by a connection, and wherein the connection con-
        nects a first node of an earlier layer with a second
        node of a later layer, and wherein a bias is introduced
        to each of the one or more nodes that are part the one
        or more hidden layers and the output layer; and
    a plurality of weights, wherein each weight is associ-
        ated with a connection, and at least a portion of the
        plurality of weights and a plurality of biases of the
        one or more neural networks are protected from
        reverse engineering based on one or more coded
        approaches, and wherein only a portion of the plu-
        rality of weights are encrypted, and a binary repre-
        sentation represents a numerical value of the plural-
        ity of weights and the plurality of biases, and
        wherein the one or more controllers execute:
    a predefined algorithm that that selects specific bits of
        the binary representation of the plurality of weights
        and a plurality of biases of at least one layer of the
        one or more neural networks to encrypt, wherein the
        predefined algorithm anticipates the number and the
        position of the specific bits that are constant for all
        the weights and biases for a given type of computer
        number format.

14. The ML/AI system of claim 13, wherein the one or
more coded approaches include applying a keyed permuta-
tion to at least one of the following: a portion of the plurality
of weights and a portion of the plurality of biases.

15. The ML/AI system of claim 13, wherein the one or
more controllers execute instructions to:
    apply an exclusive OR to an unencrypted value of a
    weight that is part of an encrypted layer with an
    unencrypted value of a weight that is part of an unen-
    crypted layer;
    store a result of the exclusive OR function in a position of
    a value of the unencrypted weight of the unencrypted
    layer;
    apply an exclusive OR to an unencrypted value of a bias
    that is part of an encrypted layer with an unencrypted
    value of a bias that is part of an unencrypted layer; and
    store a result of the exclusive OR function in a position of
    the value of the unencrypted bias of the unencrypted
    layer.

16. The ML/AI system of claim 13, wherein the one or
more coded approaches include generating a cryptographi-
cally secure sequence of pseudorandom values of a fixed size by a stream cipher that include a predefined number of pseudorandom values, wherein the predefined number of pseudorandom values is selected to match a number of weights and biases that are part of a first preselected group of weights and biases, wherein each of the weights and the biases of the first preselected group of weights are biases are exclusive ORed with one of the pseudorandom values.

17. The ML/AI system of claim 1, wherein the predefined algorithm encrypts the sixteen most significant mantissa bits of a 32-bit floating point number.

\* \* \* \* \*